July 27, 1937.  F. H. GULLIKSEN  2,088,473
SLITTER CONTROLLER
Filed April 24, 1935  3 Sheets-Sheet 1

WITNESSES:  INVENTOR
  Finn H. Gulliksen.
  BY
  Paul E. Friedemann
  ATTORNEY

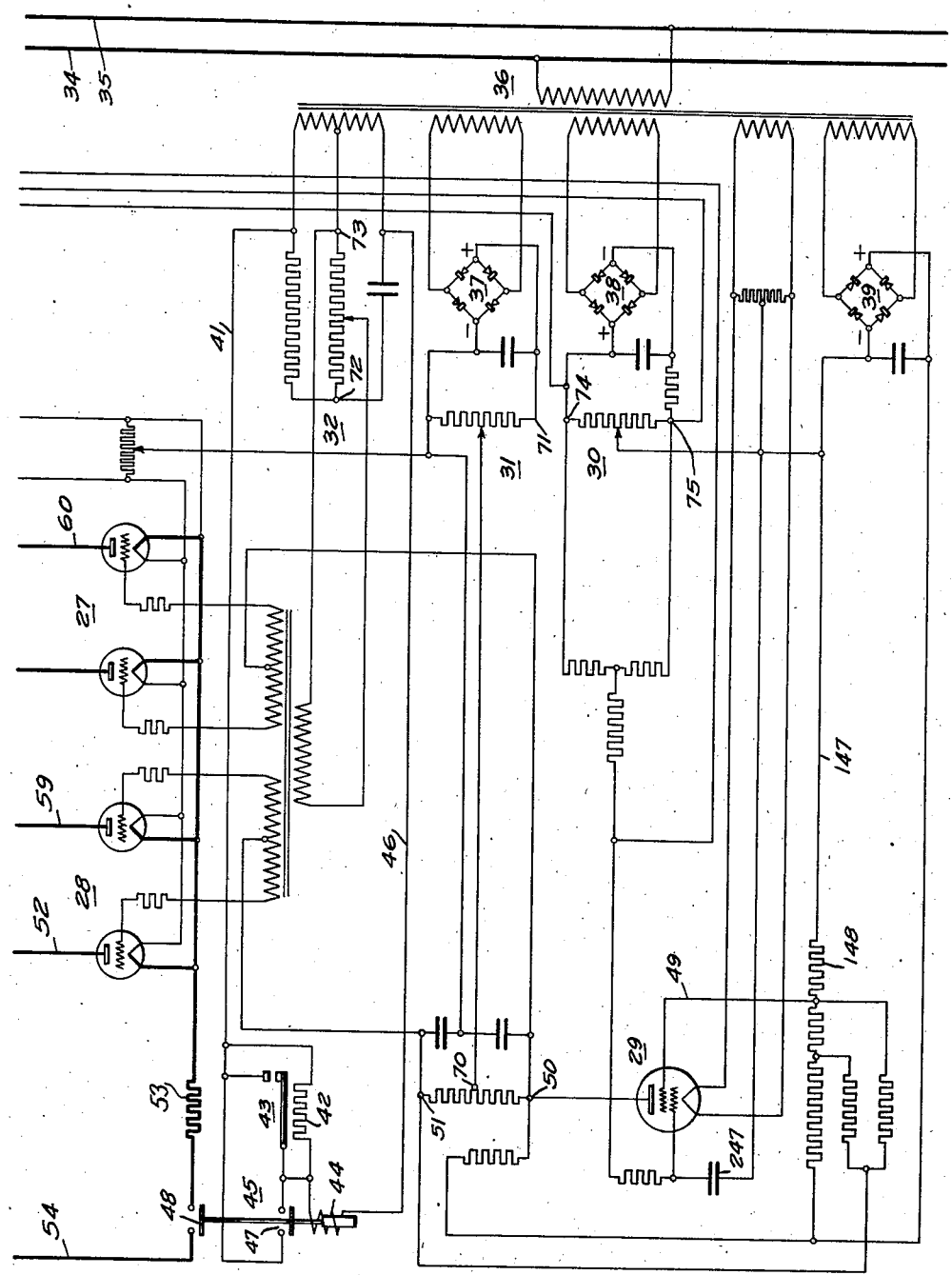

July 27, 1937.   F. H. GULLIKSEN   2,088,473
SLITTER CONTROLLER
Filed April 24, 1935   3 Sheets-Sheet 3
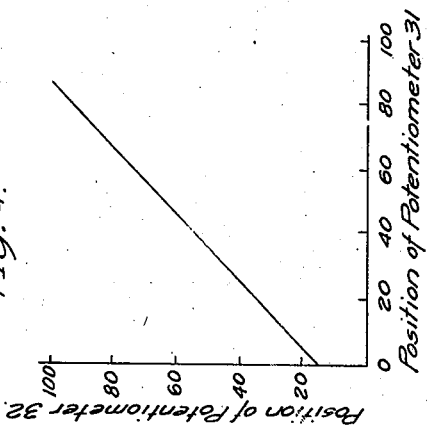
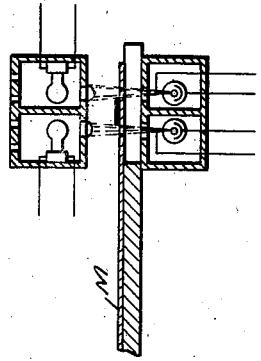
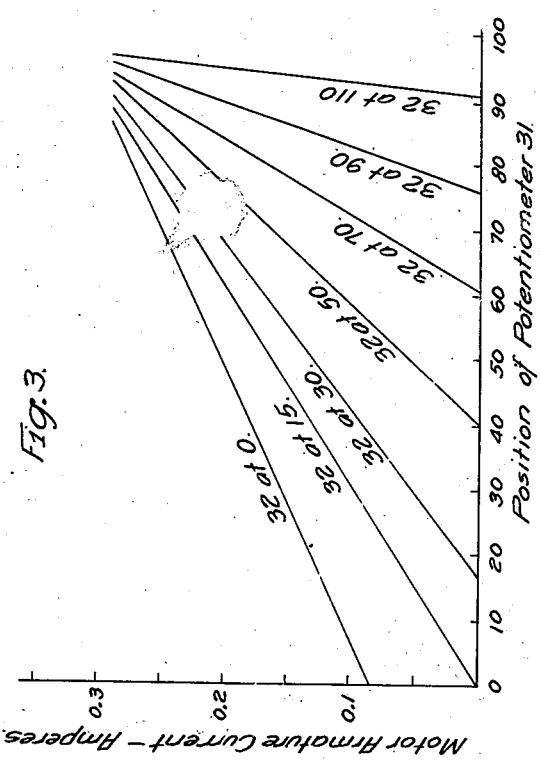
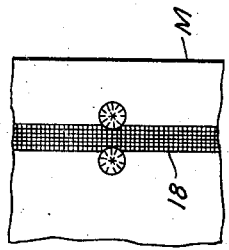
WITNESSES:
INVENTOR
Finn H. Gulliksen.
BY
ATTORNEY Patented July 27, 1937

2,088,473

UNITED STATES PATENT OFFICE 2,088,473

SLITTER CONTROLLER

Finn H. Gulliksen, Wilkinsburg, Pa., assignor to Westinghouse Electric & Manufacturing Company, East Pittsburgh, Pa., a corporation of Pennsylvania Application April 24, 1935, Serial No. 17,961

7 Claims. (Cl. 164—65)

This invention relates to an electrical system of control for a motor, more particularly to a photo-electric system of control for a motor controlling the position of the slitters of sheet material with reference to the sheet of material.

While my system of control has general utility for controlling the operation of a motor or other electrical device, I have shown it in conjunction with the slitters of a paper-making machine.

In the art of making paper, it often is desirable to slit the paper into strips of predetermined width. Such slitting is to be performed with the minimum amount of waste. This means that a definite relation of the slitters is to be maintained with reference to the edge of the paper. However, since the edge of the paper coming from the paper-making machine does not define a sharp line nor a straight line, any device responsive to the position of the edge of the paper designed to control the position of the paper relative to the slitter is not a satisfactory system of control.

Electrical contact devices disposed adjacent the edge of the material to be slit, as well as mechanical devices similarly positioned, are known, but such devices are cumbersome, complicated, expensive, and, what is their worst defect, are not reliable.

One object of my invention is to provide simple and reliable control means for controlling the position of a sheet material to be slitted, or subjected to other operation, with reference to the slitters, or other devices operating on the material.

Another object of my invention is to utilize a photo-electric scanner disposed to scan a continuous, or a discontinuous, mark disposed longitudinally of the sheet material for controlling the position of the mark with reference to the scanner.

A further object of my invention is to photo-electrically control the direction of operation of a motor or other electrical device in response to variations in position of a mark on a material operated upon by a machine.

A still further object of my invention is to shift the position of a feeding device feeding sheet material to a slitter so that the slitters hold a definite position during operation with reference to a mark disposed longitudinally of the sheet.

It is also an object of my invention to provide very sensitive means including photo-electric scanners for controlling the slitting operation of sheet material.

A more specific object of my invention is to provide for axially shifting the supply roller carrying sheet material so that a mark, such as a continuous or discontinuous printed line darker than the material, or of a different color than the material, or a line lighter than the material, or a line in the material making it either more reflecting, opaque, or translucent, than the material, as the case may require, disposed longitudinally of the material, is maintained in a definite relation to a machine element operating on the material.

Other objects and advantages will become more apparent from a study of the following specification considered in conjunction with the accompanying drawings, in which:

Figures 1 and 2 show a complete electrical control system embodying my invention;

Fig. 3 shows a plurality of curves showing variations in armature current of the motor shown in Fig. 2 with various positions of two of the potentiometers shown in Fig. 1;

Fig. 4 shows a curve showing the relative positions of two of the potentiometers shown in Fig. 1 to get zero armature current;

Fig. 5 shows one relation the beam of light from the lights shown in Fig. 1 may take when projected on the material; and Fig. 6 shows the position of the scanners with reference to the material and the machine frame.

Figure 1:
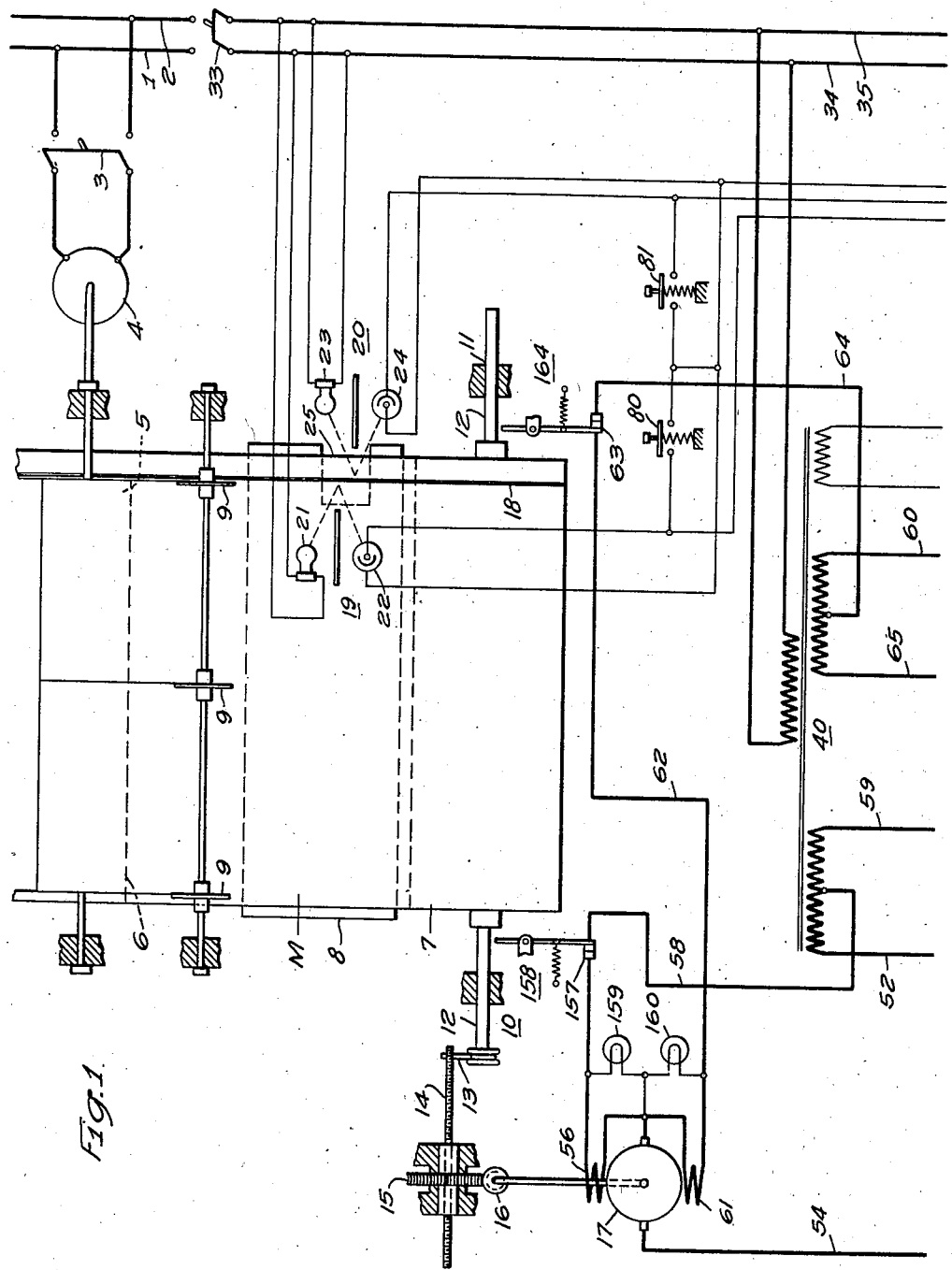

Referring more particularly to Figs. 1 and 2 showing my system of control applied to a paper slitting machine, 1 and 2 designate a pair of buses energized with alternating current. By the closure of switch 3, the motor 4 is energized to operate the winding drums 5 and 6 for the slitted or dimensioned strips of paper or material M. Only two winding drums 5 and 6 have been shown, but it is readily apparent that this is illustrative and that any number may be coupled to be driven by the motor 4, since the width of the strips will be determined entirely by the relative position of the slitters 9.

The material M is fed to the slitters from a supply reel 7, from which the material passes over an arcuate table 8 disposed in front of the slitters 9. The shaft 12 of the supply reel is disposed in bearings 10 and 11 so that it may be shifted longitudinally of the bearings. Such shifting of the supply reel obviously shifts the material M with reference to the slitters 9.

The shaft 12 is constructed to be engaged by a bifurcated member 13 which is operated by a threaded member 14 passing through a threaded sleeve of the worm wheel 15. The worm wheel 15 is driven by the worm 16 coupled to the shaft of the reversible motor 17.

The material M is provided longitudinally thereof with a line or mark 18 which may be continuous or discontinuous and a pair of scanners 19 and 20 are disposed to scan the mark 18, and the control is such that if the mark 18 shifts with reference to the scanners 19 and 20, the motor 17 is caused to operate in one or the other direction to reposition the line 18 to the desired position with reference to the scanners.

The scanners 19 and 20 include a pair of lights 21 and 23 and a pair of photo-cells 22 and 24, respectively. Furthermore, in actual practice, these scanners are insulated from each other by asbestos or other heat insulating material and are positioned above the material M. The position of the scanners need not be in the same plane transversely of the material, but, in practice, would be so positioned that one scanner scans one edge of the line 18 at one point, whereas the other scanner scans the line 18 at the other edge of another point. Such positioning is merely desirable because of space requirements.

To accomplish the novel results of my invention, the scanners may, in fact, scan the line 18 in the same plane transverse of the material as indicated in Figs. 5 and 6, or, if desirable, the photo-cells may be disposed below the material, as also shown in Fig. 6, and the lights above the material, or vice versa, in which cases the translucency of the material rather than its reflecting qualities are utilized to control the motor 17.

The direction of operation of the motor 17 is more directly controlled by the two pairs of electric discharge devices 27 and 28, which are, in turn, controlled by the grid-controlled amplifier tube 29. Three potentiometers 30, 31, and 32 are so connected that the operation of the amplifier tube, as well as the discharge devices, may be suitably controlled. The operation of these potentiometers will become more apparent from the discussion hereinafter given.

If it is desired to start the operation of my system of control, assuming that the material has been threaded on the winding rolls 5 and 6 and that motor 4 is operating, then the attendant may close switch 33, thereby energizing the lights 21 and 23 and the conductors 34 and 35. This means that transformers 36 and 40 are energized with the result that the full-wave rectifiers 37, 38, and 39 are energized to provide the necessary direct-current potential for the potentiometers, as well as the desirable bias for the grids of the respective electronic devices constituting part of my scheme of control.

Since the transformer 36 is energized, an energizing circuit will be established to conductor 41, heater 42 for the thermostatic time-limit control means 43, actuating coil 44 of the relay 45, conductor 46 back to lower terminal of the upper secondary winding of the transformer 36. After an interval of time of approximately ten seconds, which interval of time is selected long enough to permit the filaments of the electric discharge devices 27 and 28 of the amplifier 29, the photo-cells 22 and 24 and the lights 21 and 23 to be properly heated, the time-limit device 43 will close its contact members, thereby shunting the heater 42 and thus providing sufficient energization for the actuating coil 44 of the relay 45 to cause this relay to operate.

Operation of relay 45 closes the contact members 47, which contact members provide a holding circuit for the actuating coil 44 and provide a shunting circuit for both the heater 42 and the contact members of the thermostatic time-limit device 43. Operation of the relay 45 also closes the contact members 48 to thus close one portion of the armature circuit for the motor 17. Motor 17, however, will not be energized unless the line 18 is not properly positioned with reference to the scanners.

It should be noted that the negative terminal of the rectifier 39 is connected to one of the grids of the amplifier tube 29 through the conductor 10 147, resistor 148, and conductor 49, thereby placing a predetermined negative bias on one of the grids of the amplifier tube 29. By proper selection of the resistance value of the resistor 148 and the potentials on the principal electrodes of the amplifier tube 29, the amplifier tube 29 may be caused to operate at the midpoint or near the midpoint of its characteristic, which means that any variation of the bias of the lower grid of the amplifier tube 29 will vary the current carried by the amplifier tube, and the amount of current with reference to the normal current it carries will be determined by the character of the bias of the lower grid. In other words, if the bias of the lower grid becomes more negative, the current in the amplifier tube 29 will be increased, whereas if the bias of the lower grid becomes more positive, the current in the amplifier tube 29 will be decreased.

In Fig. 3, a plurality of curves are shown showing the armature current with various positions of the sliding contact of the potentiometers 31 and 32. Fig. 4, on the other hand, illustrates the no-load armature current on the motor for positions of the potentiometers 31 and 32, respectively. From a study of these curves, it is apparent that the sensitivity of the control can be very materially changed by merely shifting the relative position of the potentiometers 31 and 32, and it also shows what relative position the potentiometers should not take if a sensitive control is desired.

By means of potentiometer 31, a negative bias may be applied in series with the grids of the electric discharge devices 27 and 28. If the total direct-current voltage across the potentiometer 31 is selected to be 62 volts, and each division of the potentiometer is selected to be approximately .6 volt, then by shifting the movable contact member of potentiometer 31 upwardly, the negative bias on the electric discharge devices is increased and a correspondingly greater change in voltage across the junctions 70 and 50 and junctions 70 and 51 is needed to cause the electric discharge devices 27 and 28 to break down and carry current. Therefore, by shifting the movable contact member of the potentiometer 31 towards junction 71, the zone within which my scheme of control is sensitive is increased.

The purpose of potentiometer 32 is to vary the amount of change of the currents in the electric discharge devices 27 and 28 for a given change in photo-tube illumination. With the movable contact member of the potentiometer 32 at the junction 72, the current in the discharge devices will change abruptly from zero to its maximum value when the photo-tube illumination is changed. As the movable contact member is shifted toward the right, namely, toward the junction 73, the current through the electric discharge devices 27 and 28 and consequently the speed of the motor 17 will change gradually as the photo-tube illumination is varied. From the diagram shown in Fig. 2, it is apparent that the potentiometer 32 applies a voltage to the grids of the electric discharge devices 27 and 28, which is 90° displaced relative to the voltage on the anodes of the electric discharge devices. This displacement in electrical degrees of the bias on the grids and the bias obtained from the potentiometer 31 determine the operating adjustment of the electric discharge devices 27 and 28.

Assuming zero voltage across junctions 50 and 51, the no-load motor current will be as shown in Fig. 4, which gives the variation in motor current for varying adjustments of potentiometer 31 for various positions of the potentiometer 32.

The curves shown in Figs. 3 and 4 were taken from an actual installation, including a resistor 53 in series with the motor, as shown in Figs. 1 and 2. Fig. 4 thus shows a curve giving the proper adjustments of potentiometer 31 for various positions of potentiometer 32 which gives zero motor current. This adjustment corresponds to zero zone of insensitivity, or, in other words, corresponds to the zone of maximum sensitivity.

In practice, it may not be desirable to adjust the relative position of the movable contact members of the potentiometers 31 and 32 to the zero zone of insensitivity, or the zone of maximum sensitivity, because it may develop that after the electric discharge devices have been used awhile this zone of maximum sensitivity may not be at one point, but two points, with an intermediate neutral zone within which region variations of the illumination of the photo-cells might not cause a control action on the motor 17. It would, therefore, in practice, be desirable, as any one skilled in the art studying the circuit diagram shown in Figs. 1 and 2 would know, to adjust the relative position of potentiometers 31 and 32 to some less sensitive position with correspondingly greater chance to have absolutely reliable operation.

The potentiometer 30 is applied to balance the photo-tube bridge circuit in order to compensate for the difference in photo-tube sensitivity, for alignment of the two scanners, and to compensate for color variations of the printed line and the paper. If the sensitivity of the two photo-tubes is alike, namely, their characteristics are alike, and their adjustment is the same, the positioning of the movable contact member of the potentiometer 30 at the midpoint between the junctions 74 and 75 should not cause the breakdown of any of the electric discharge devices 27 and 28. However, if these discharge devices do operate when the movable contact member of potentiometer 30 is in the mid-position, it may merely be shifted to such a point where operation of the electric discharge devices 27 and 28 ceases, namely, to such a point that motor 17 will not be operated.

Assuming that the potentiometers 31 and 32 are properly adjusted so that the motor 17 is not operated when the line 18 is in proper relation with reference to the scanners 19 and 20, then a shifting of the material in one or the other direction will vary the illumination on the photo-tubes 22 or 24, as the case may be, and cause the motor 17 to operate to reestablish proper operating conditions. If it be assumed that the material M shifts toward the right, and also be assumed that such shifting toward the right increases the illumination on photo-tube 22, then more current is carried by the photo-tube 22 and in consequence the lower grid of the amplifier 29 becomes more positive with the result that the amplifier tube 29 carries more current.

If the mark or line 18 is darker than the material to the human eye, it does not mean that less light would be reflected into the photo-tubes if the beam of light should fall on the line, since the sensitivity of the photo-tube neither in color nor other like characteristics corresponds to the sensitivity of the human eye. What may mean a decrease in illumination by reason of the change of color to the human eye may, in fact, mean an increase in the illumination to the photo-tube or "electric eye".

An increase of current in the amplifier tube 29 makes junction 50 more negative and thus junction 51 more positive with the result that the pair of electric discharge devices 28 break down or discharge to carry current, thereupon establishing during a definite part of one-half cycle a current from the conductor 52, through the left-hand electric discharge device of the pair of electric discharge devices 28, through resistor 53, contact members 48, conductor 54, the armature of the motor 17, field winding 56, contact members 157 of the limit switch 158, conductor 58 through a portion of one of the secondary windings of the transformer 40 to the conductor 52. For a similar portion of the second half cycle, current will be carried from conductor 59 through the right-hand electric discharge device of the pair of electric discharge devices 28 and thence through the motor circuit as just stated.

A pair of indicating lights 159 and 160 are connected across the respective field windings of the motor 17 and will thus indicate the direction of operation of the motor to the attendant. If the adjustment is such that both field windings 56 and 61 carry current at all times and only an unbalancing effect determines the direction of operation of the motor 17, then the difference in brightness of the lights 159 and 160 will determine the direction of operation of the motor 17. On the other hand, if the adjustment is such that current is carried by one of the respective field windings only, when the motor is to operate, then the particular light shown to be illuminated will indicate the direction of operation of the motor.

For the operation hereinbefore explained, the motor 17 will operate to shift the shaft 12 toward the left, so that the material and thus the line 18 are again properly positioned with reference to the scanners 19 and 20 and are thus properly positioned with reference to the slitters 9. It should be noted that the outside slitters dispose of a small marginal strip on the paper and that the right-hand outside slitter cuts the material inside of the line so that the finished strips, namely, the slitted strips of paper disposed on the drums 5 and 6, shows no lines whatsoever.

If the variation of the strip is such that the roller 7 has to be shifted toward the left repeatedly, a trunnion-like projection on the roller 7 will engage the limit switch 158 and open the circuit for the motor 17, thereby stopping any further adjustments.

If the material M moves toward the left, thereby increasing the illumination on the photo-tube 24, the potential on the lower grid of the amplifier 29 is made more negative decreasing the current through the amplifier 29, which thus makes the junction 50 more positive with the result that the pair of discharge devices 27 will alternately break down to establish an energizing circuit for the motor from these discharge devices through resistor 53, contact members 48, conductor 54, the armature of the motor 17, the field winding 61, conductor 62, contact member 63 of the limit switch 164, conductor 64, and thence through a secondary winding of the transformer 40 through conductors 60 and 65 to the discharge devices 27.

The limit switch 164 operates exactly like the limit switch 158 and is actuated by repeated adjustments of the roll 17 toward the right.

Starting push buttons 80 and 81 are merely means for shunting the photo-tubes 22 and 24 to effect the operation of motor 17 independent of the control of the scanners 19 and 20.

The operation and purpose of the various resistors and capacitors shown need not be discussed, since their function in connection with discharge devices is well known to those skilled in the art. The purpose of capacitor 247 utilized with amplifier tube 29 may, however, not be readily apparent. This capacitor adds a time delay to the operation of tube 29. Small variations or irregularities of the line or mark 18, therefore, do not cause the discharge devices 27 or 28 to break down.

Fig. 6 shows a pair of scanners utilizing the translucency of the material adjacent the line and through the imprinted line on the material to control the operation of motor 17. The arrangement of the scanners shown in Fig. 6 is such as to throw the beams of light on the material, as indicated in Fig. 5, but it should be apparent that in practice it is not necessary to mount these scanners at the same point on the machine, but each scanner may be mounted at a different point and still the controlling action may be readily accomplished. Furthermore, the arrangement may even be such that the light on one side of the line is disposed to illuminating the photo-cell on the other side of the line, and the light on the second side of the line be disposed to illuminate the photo-cell on the first side of the line.

I am, of course, aware that others skilled in the art, particularly after having had the benefit of the teachings of my invention, can devise other circuit diagrams or photo-electric control means for controlling the direction of operation of a motor, and I, therefore, do not wish to be limited to the particular showing made in the foregoing specification and accompanying drawings, but wish to be limited only by the pertinent prior art and the scope of the appended claims.

I claim as my invention:

1. In a system of control, in combination, a direct-current reversible motor, a source of alternating-current energy, electric discharge devices adapted to control the direction of operation of the motor, a machine, including a material source of supply, for moving sheet material, a mark disposed longitudinally of the sheet, a photo-electric scanner scanning said mark and responsive to variations in position of the mark to control the direction of rotation of the motor, said motor being coupled to the material source of supply of the machine operating on the material to reposition the mark to a desired position with reference to the scanner.

2. In a system of control for electric machines, in combination, a motor coupled to operate at least one winding roller for winding sheet material, a supply reel, a slitter disposed between the supply reel and the winding roller, a photo-electric scanner mounted in fixed relation to the slitter and adapted to scan a mark disposed longitudinally of the sheet material, means for shifting the supply reel transversely of the slitter, and means responsive to the scanner to control said means for shifting the supply reel to maintain the mark on the material in a definite relation to the scanner.

3. In a system of control for electric devices, in combination, a motor, a plurality of winding rolls for winding sheet material driven by the motor, a supply reel, a plurality of slitters disposed between the supply reel and the winding rolls, a photo-electric scanner mounted in fixed relation to the slitter and adapted to scan a mark disposed longitudinally of the sheet material, means for shifting the supply reel transversely of the slitter, and means responsive to the scanner to control said means for shifting the supply reel to maintain the mark on the material in a definite relation to the scanner.

4. In a system of control for controlling electric devices adapted to control sheet slitting machines, in combination, a slitting machine, means for moving a sheet of material, of a certain width and having a mark or line disposed longitudinally thereof, in a longitudinal direction by said machine, means for shifting the material transversely of its direction of motion, and photo-electric means responsive to the transverse movement of the line on the material and thus the material to maintain the travel of the material in a given direction with reference to said machine.

5. In a system of control for electric devices, in combination, means for moving a sheet of material from a supply reel past slitters to be slit in strips of uniform width onto a plurality of winding rollers, said material having a continuous mark or a plurality of aligned marks, disposed longitudinally thereof, means whereby the sheet may be moved transversely of its normal direction of travel, a photo-electric scanner disposed to scan one edge of the mark, means, responsive to a deviation of the mark in a given direction from the scanner, to control said sheet shifting means to shift the material transversely in one direction, a second photo-electric scanner disposed to scan the other edge of the mark, means, responsive to a deviation of the mark in a given direction from this second scanner, to control said sheet shifting means to shift the material transversely in the other direction, the controlling effect of said two scanners, therefore, maintaining the movement of the mark with reference to the scanners and thus the slitters in a given direction.

6. In a system of control for electric devices, in combination, a motor, a plurality of winders operated thereby, a plurality of slitters, a supply reel for supplying sheet material to the winders, said slitters being disposed between the supply reel and the winders, and said sheet material having indicia disposed longitudinally of the sheet and adjacent the edge thereof, a pair of photo-electric scanners disposed to scan the opposite regions of the indicia, and means, responsive to the scanners, operable to maintain the indicia in a definite relation to the scanners and thus the slitters.

7. In a system of control for a slitting machine for sheet or belt-like material being moved in the direction of its length by said slitting machine, said material having aligned indicia disposed longitudinally thereof, photo-electric scanning means scanning said indicia, and means responsive to the scanning means upon a movement of the material out of its desired path of travel to reestablish the desired longitudinal movement of the sheet relative to the slitters of the slitting machine.

FINN H. GULLIKSEN.